United States Patent Office 3,472,922
Patented Oct. 14, 1969

3,472,922
METHOD FOR THE PRODUCTION OF SPHERICAL PARTICLES
Karl Knotik, Siegendorf, and Peter Koss and Heinz Markl, Vienna, Austria, assignors to Osterreichische Studiengesellschaft fur Atomenergie Ges. m.b.H., Vienna, Austria
No Drawing. Filed July 7, 1966, Ser. No. 563,350
Claims priority, application Austria, July 8, 1965, A 6,229/65
Int. Cl. G21c 21/00
U.S. Cl. 264—.5                                       11 Claims

ABSTRACT OF THE DISCLOSURE

A method for the production of spherical particles from metals and metal compounds, such as from nuclear fuel materials, is comprised of the steps of melting a salt of the metal for forming the spherical particles to prepare a liquid mix. Preferably, the salt is melted in its own water of crystallisation. Next the liquid mix is treated to form drops, this can be done by forcing the mix through a needle jet or by spraying the mix off a rotating disk, in either case the drops formed are deposited into a column or bath of oil for cooling the drops to below the melting temperature of the mix and forming the spherical particles. The remaining steps include drying of the spherical particles, and adding coating material, such as graphite or flue soot, or otherwise treating the spherical particles for forming oxides, nitrites, or sulfides.

---

The invention concerns a method for the production of spherical particles preferably from nuclear fuel materials. The invention is characterised in that, using the initial material of the particles, a fluid mix is formed and this mix is then sprayed or allowed to drain off, the drops forming thereby being solidified as they descend under gravity and then, if desired, dried and converted into another compound.

The method according to the invention is particularly suitable for the production of spherical particles from metals or metal compounds.

For the production of the fluid mix from the initial material, the melts of their salts may conveniently be used.

The invention is described in the following with reference to nuclear fuel. The possibility exists of dividing melts of salts which are produced by the evaporation of solutions after the preparation of uranium or thorium, into drops and then converting them, for example, into carbide, oxide, nitride, sulphide. Uranyl-nitrate which is in the form of $UO_2(NO_3)_2 \cdot 6H_2O$ melts in its own water of crystallisation at about 60° C. is particularly suitable therefor.

By the addition of organic compounds, for example urea, the melting point can be lowered, this is especially the case with $Th(NO_3)_4 \cdot xH_2O$. For lowering the melting point to the desired level, additions of 2 to 10% of organic substances is sufficient. The size of the melt drops can be controlled by the addition of moisteners. The melted drops fall for condensation into liquids or gases which are eventually replaced by reaction mediums which for example act as water extractors or as the exchangers for salination, whereby neither the melts nor the reaction product from melts and reaction agents can be soluble in the liquid or gases.

Sometimes it is convenient to add carbon to the melt, for example if later conversion into carbide takes place.

The melt, for example an uranyl-nitrate melt, may be allowed to drop through a needle jet into an oil bath whose bottom part is cooled. The particles formed are very homogenous. The quantity produced of the desired size is a function of the speed of dropping which itself can be adjusted to the optimum by pressure loading and adjustment of the needle jet.

The melt may however also be thrown by the spraying action of a rotating disc into a bath full of oil. So that the drops of melt do not adhere to the wall of the bath, the oil bath is thoroughly stirred.

The requirements for apparatus for these two processes are not very elaborate. In the first case the apparatus consists in the main of a glass pipe having a heating jacket and a needle jet outlet. The melt can be pressed out through the jet in the shape of drops by means of precisely adjustable application of pressure. The jet drips directly into a long glass pipe filled with oil. The upper part of the pipe is heated, the lower part cooled.

The apparatus for the second process consists of a stirring mechanism having a disc and a propeller which dips into a bath of oil or of $CCL_4$. The particles sprayed by the disc are taken from the bath in discrete charges.

The further working of the particles is alike in both cases. They are washed with organic liquids for example $C_2H CL_3$ or $CCL_4$ and dried for one hour at about 60° C. and 0·1 torr.

After drying the particles may be converted into the carbide for example. For this the dried particles are embedded in graphite powder or coal powder, the volume ratio being substantially 1:2 and filled into a graphite crucible in which the mixture is heated, under an atmosphere of a protective gas, up to the melting point of the uranium carbide. Temperatures of from 2,500° C. to 2,600° C. have proved favourable for this.

It is still more favourable if the annealed particles are embedded in flue soot since in this case when the carburation smelting process is carried out, the layer formed in the surface of the carbide particles has more favourable characteristics, that it, it is tear free, even and purely crystalline. This has the advantage that on subsequent coating of the particles with carbon or silicon carbide, which is carried out at a temperature of 1,500° C. or above, a lower proportion of carbide can diffuse into the coating layers. The conversion of the particles into carbide takes place in a bed of flue soot in a similar manner to in a graphite bed.

The annealed particles may also be moistened with naphtha which is mixed with tensid bearing oil (tensidhältigen Öl) and subsequently encased with flue soot in a drum or on an indented plate. The thickness of this casing can be from 0.5 to 2 mm. The particles encased in flue soot are arranged in not very deep layers in a graphite crucible and converted into carbides as above. The production of carbide particles thinned with carbon is carried out in a similar manner or the encased particles loosely scattered in a graphite crucible are sintered. The melting temperature can with flue soot be about 150° C. lower than on melting in a bed of graphite.

The embodiment of the invention described above has in the main been given with reference to Uranium and Thorium. Other metals such as for example plutonium and the transition metals and especially the metals of groups 4b, 5b, and 6b of the periodic system can also be treated in a similar manner. Thus, spherical particles have already been successfully produced from molybdenum, zirconium and tungsten. Materials other than those given above should, treated in the same way, give good results.

If the dried particles are not to be worked into carbide but into oxide particles, then particles of oxygen bearing salts or such as on annealing produce oxide, are sintered at suitable temperatures loosely scattered in a vacuum or protective gas. The production of $UO_2$ cores results for example from sintering the dried uranylnitride particles in a hydrogen atmosphere at temperatures between 1,600° C. and 2,000° C. Thereby all high grade uranoxides are reduced to the oxide of $U^{IV}$ and show themselves as definite $UO_2$ forms.

It is advantageous but not essential that the salts be melted in their own water of crystallisation, but meltable salts free of water of crystallisation may also be used if they can subsequently be converted into another desired compound. Not only spheroids but also ingots of for example carbides, oxides, borides, silicides etc. may be produced in the manner described.

The conversion of nitrides or sulphides for example takes place by sintering of carboniferous dried particles, in gases such as $Ar-NH_3$, or $H_2-NH_3$, or $Ar-H_2S$ or $H_2=H_2S$, in the same way as has been described for the $UO_2$ cores.

What we claim is:

1. A method for the production of spherical particles formed of an initial material comprised of a metal selected from the group consisting of uranium, thorium, plutonium, and the metals in groups $4b$, $5b$, and $6b$ of the periodic system, and comprising the steps of adding an organic compound to a salt of the initial material containing water of crystallization for lowering its melting point, melting the salt of the initial material in its own water of crystallzation for preparing a liquid mix, dispersing the liquid mix to form drops, applying a wetting agent to the drops of the liquid mix for regulating the size of the drops and passing the drops through a fluid mass for cooling the drops to below the melting temperature of the liquid mix for forming spherical particles.

2. A method as set forth in claim 1, comprising the step of drying the spherical particles after they have been cooled to below the melting temperature.

3. A method as set forth in claim 1, wherein the step of dispensing the liquid mix comprises forcing the liquid mix through a restricted opening to form drops.

4. A method as set forth in claim 3, comprising the step of passing the drops from the restricted opening downwardly through a passageway filled with oil.

5. A method as set forth in claim 4, comprising the step of heating the upper end of the passageway through which the drops are flowing and cooling the lower end of the passageway.

6. A method as set forth in claim 1, wherein the step of dispensing the liquid mix comprises directing the liquid mix onto a rotating surface for forming drops thereof and passing the drops into a bath of oil, stirring the oil bath, and removing spherical particles as discrete members from the bath of oil.

7. A method as set forth in claim 1, wherein in the step of melting a salt, uranyl nitrate is melted in its own water of crystallisation for forming the liquid mix to be used in forming spherical particles.

8. A method as set forth in claim 1, comprising the step of placing the spherical particles in a mass of powderous carbon material, and heating the coated particles in a protective atmosphere for forming a carbide thereof.

9. A method as set forth in claim 1, comprising the step of heating the spherical particles made from a salt containing oxygen in a protective atmosphere for forming an oxide thereof.

10. A method as set forth in claim 8, comprising the step of treating the carbon coated spherical particles with ammonia for forming nitrites thereof.

11. A method as set forth in claim 8, comprising the step of treating the carbon coated spherical particles with gases containing sulphuretted hydrogen for forming sulfides thereof.

References Cited

UNITED STATES PATENTS

| | | | |
|---|---|---|---|
| 2,265,180 | 12/1941 | Maier | 75—20 |
| 3,129,188 | 4/1964 | Sowman et al. | 252—301.1 |
| 3,312,631 | 4/1967 | Smith | 252—301.1 |
| 3,355,393 | 11/1967 | Swanson | 252—301.1 |

REUBEN EPSTEIN, Primary Examiner

M. J. SCOLNICK, Assistant Examiner

U.S. Cl. X.R.

75—5; 252—301.1; 264—14